US007427188B2

(12) United States Patent
Neuhoff et al.

(10) Patent No.: US 7,427,188 B2
(45) Date of Patent: Sep. 23, 2008

(54) TURBOMACHINE BLADE WITH FLUIDICALLY COOLED SHROUD

(75) Inventors: Heinz Neuhoff, Waldshut-Tiengen (DE); Remigi Tschuor, Windisch (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/685,930

(22) Filed: Mar. 14, 2007

(65) Prior Publication Data

US 2007/0154312 A1 Jul. 5, 2007

Related U.S. Application Data

(63) Continuation of application No. PCT/EP2005/054448, filed on Sep. 8, 2005.

(30) Foreign Application Priority Data

Sep. 16, 2004 (CH) ................................. 1525/04

(51) Int. Cl.
*F01D 5/18* (2006.01)
*F01D 5/22* (2006.01)
(52) U.S. Cl. .................................................. 416/97 R
(58) Field of Classification Search ................. 415/115; 416/96 R, 97 R
See application file for complete search history.

(56) References Cited

U.S. PATENT DOCUMENTS

| 3,800,864 | A |   | 4/1974  | Hauser et al. |           |
|-----------|---|---|---------|---------------|-----------|
| 4,820,123 | A |   | 4/1989  | Hall          |           |
| 5,320,485 | A |   | 6/1994  | Bourguignon et al. |      |
| 5,350,277 | A | * | 9/1994  | Jacala et al. | 416/90 R  |
| 5,413,456 | A | * | 5/1995  | Kulak et al.  | 415/115   |
| 5,498,126 | A | * | 3/1996  | Pighetti et al. | 415/115 |
| 5,669,759 | A |   | 9/1997  | Beabout       |           |
| 6,132,173 | A | * | 10/2000 | Tomita et al. | 416/96 R  |
| 6,471,480 | B1| * | 10/2002 | Balkcum, III et al. | 416/97 R |

(Continued)

FOREIGN PATENT DOCUMENTS

DE 10131073 6/2002

(Continued)

OTHER PUBLICATIONS

International Search Report for Application No. PCT.EP2005/054448, mailed on Jan. 18, 2006.

(Continued)

*Primary Examiner*—Edward Look
*Assistant Examiner*—Nathaniel Wiehe
(74) *Attorney, Agent, or Firm*—Darby & Darby

(57) ABSTRACT

A turbomachine blade, in particular a turbine blade of a gas turbine includes a blade root with a cooling-fluid feed, a blade tip formed with a shroud element. At least one throughflow passage which extends in the blade longitudinal direction is arranged inside the airfoil. A shroud cooling passage is formed in the shroud element at least along a section of the latter, the shroud cooling passage being connected via an opening to the throughflow passage, and a cooling fluid flowing through this shroud cooling passage during operation of the turbomachine blade. At least one flow-guiding element for guiding at least some of the cooling-fluid flow flowing through the shroud cooling passage is arranged in the shroud cooling passage and/or in an inflow or outflow to or from the shroud cooling passage.

20 Claims, 4 Drawing Sheets

U.S. PATENT DOCUMENTS 7,147,439 B2 * 12/2006 Jacala et al. .............. 416/97 R
2002/0098078 A1  7/2002 Beeck et al.

FOREIGN PATENT DOCUMENTS

| EP | 0649975 | 4/1995 |
| EP | 0955449 | 11/1999 |
| EP | 1074696 | 2/2001 |
| EP | 1215363 | 6/2002 |
| JP | 03194101 | 8/1991 |

OTHER PUBLICATIONS

Swiss Search Report for Application No. CH1525/04, mailed on Dec. 16, 2004.

* cited by examiner

TURBOMACHINE BLADE WITH FLUIDICALLY COOLED SHROUD

This application is a continuation of International Patent Application PCT/EP2005/054448 filed on Sep. 8, 2005, and claims priority to Swiss Patent Application CH 01525/04 filed on Sep. 16, 2004. The entire disclosure of both applications is incorporated by reference herein.

The present invention relates to a turbomachine blade with a fluidically cooled shroud according to the preamble of claim 1.

BACKGROUND

On account of the high turbine inlet temperatures which are normal nowadays in modern gas turbines or gas turbosets, at least the blades of the first turbine stages must often be cooled.

To cool the blades, a cooling fluid, frequently air, which has been extracted from the compressor, is passed through flow passages inside the airfoil. The cooling is effected by convective heat transfer from the passage walls to the cooling fluid. The heated cooling fluid is then often delivered through bores in the region of the trailing edge of the blade into the blade surroundings. A turbine blade fluidically cooled in this way has been disclosed, for example, by U.S. Pat. No. 4,820,123 or also by European Patent Application EP 0 649 975 A1.

On account of the ever increasing turbine inlet temperatures of modern gas turbines, it is also often necessary to cool all the components which are subjected to the flow of hot gas. Therefore, not only the airfoil but also the blade root has to be cooled. Furthermore, in particular blades of stators are often provided with shroud elements, which are then likewise to be at least partly cooled. A conventional method for cooling the shroud elements is for some of the cooling fluid which flows through the airfoil for cooling the latter to be passed through a cooling-fluid bore provided in the shroud element and for it to then be delivered outward into the surroundings of the blade. From here, the released cooling fluid ultimately passes via component gaps into the main flow of the turbine. However, due to the inflow of the cooling fluid via component gaps, flow losses of the main flow are caused on the one hand. Furthermore, the delivered cooling fluid is often still not thermally consumed for cooling purposes, so that this also results in a thermodynamic loss. A higher cooling-fluid mass flow is required for a required cooling capacity. Both these factors lead to a deterioration in the efficiency of the gas turbine or gas turboset. Cooling of the blades which is not adapted may also lead to a reduced service life of the blades.

In the case of fluidically cooled shroud elements known from the prior art, uneven distribution of the cooling capacity is also often to be observed. This often affects in particular the corner regions of the shroud elements. This may lead to the corner regions of the shroud elements not being adequately cooled and in this case to "hot spots".

On the other hand, uniform distribution of the cooling capacity over the shroud element is also often not required, but rather there are regions which have to be cooled to a greater extent, and other regions which necessitate only a lower degree of cooling. The cooling effect of the cooling fluid is therefore often not optimal.

U.S. Pat. No. 5,320,485 discloses a turbomachine blade, in particular a turbine blade of a gas turbine or gas turboset, having a blade root, a blade tip and an airfoil which extends between the blade root and the blade tip in a blade longitudinal direction and has a suction side and a pressure side, a shroud element being arranged on the blade tip.

SUMMARY OF THE INVENTION

An object of the invention is to provide a turbomachine blade of the type mentioned at the beginning with which one or more disadvantages of the prior art are reduced or avoided.

The invention helps to cool more effectively a turbomachine blade designed with a shroud element or to increase the cooling effectiveness of a cooling-fluid mass flow to be used for the cooling. The invention also helps to cool the regions of the turbomachine blade which are to be cooled in each case in adaptation to the requirements.

The turbomachine blade according to the invention comprises a blade root, a blade tip and an airfoil. The airfoil extends between the blade root and the blade tip in a blade longitudinal direction and has a suction side and a pressure side. Furthermore, the blade tip is provided with a shroud element. At least one throughflow passage which extends in the blade longitudinal direction runs inside the airfoil. Furthermore, a shroud cooling passage is formed in the shroud element at least along a section of the latter, this shroud cooling passage being connected via an opening to the throughflow passage, and a cooling fluid being passed through this shroud cooling passage during operation of the turbomachine blade. The shroud cooling passage is preferably of slot-shaped design. Furthermore, at least one flow-guiding element for guiding the cooling-fluid flow flowing through the shroud cooling passage is arranged in the shroud cooling passage and/or in an inflow or outflow to or from the shroud cooling passage.

The flow-guiding element serves essentially to guide at least some of the cooling-fluid flow flowing through the shroud cooling passage. In this case, the flow-guiding element causes the cooling-fluid flow to flow through the shroud cooling passage in a desired manner in such a way that a cooling capacity which is suited to the requirements and is variable in sections within the shroud cooling passage is achieved. On the one hand, the cooling efficiency of the cooling fluid used is therefore improved, and, on the other hand, the risk of the formation of hot spots is reduced, as a result of which the operational reliability of the turbomachine blade is increased overall.

In addition, however, the flow-guiding element can also fulfill further functions. Thus, for example, due to the arrangement according to the invention of a flow-guiding element, the component surface available for the heat transfer can also be enlarged. Increased heat transfer and thus a locally increased cooling capacity can be achieved in the relevant region as a result of the component surface enlarged relative to the cooling-fluid flow.

The at least one flow-guiding element may be arranged in the shroud cooling passage. However, it may also be expediently arranged in the inflow to or outflow from the shroud cooling passage, for example in the throughflow passage close to the opening, in such a way that an effect on the flow in the shroud cooling passage is brought about as a result. In the inflow, this is the case, for example, when some of the cooling fluid flowing in the throughflow passage is directed through the flow-guiding element past the inflow to the shroud cooling passage or is specifically fed to the shroud cooling passage. In the outflow, this is the case, for example, when the cooling fluid flowing out of the throughflow passage is discharged by the flow-guiding element in a specific manner.

According to an expedient configuration of the invention, the flow-guiding element is designed as a cooling rib. A plurality of cooling ribs are expediently arranged in the shroud cooling passage.

The cooling ribs are designed with a minimum thickness at which heat is dissipated by the cooling rib to an appreciable degree. The cooling ribs are therefore normally about 3-10 mm thick. Furthermore, the cooling ribs expediently extend over the entire clearance height of the shroud passage.

Cooling ribs act on the one hand in the sense of a flow-guiding element by the flow being guided along the cooling rib. Furthermore, however, cooling ribs also bring about a local increase in the heat transfer between the cooling fluid and the shroud cooling passage. For this purpose, the cooling ribs are preferably designed in one piece with the shroud cooling passage.

The cooling rib or the plurality of cooling ribs are expediently integrally cast in the shroud cooling passage. The cooling ribs are therefore already produced together with the blade during the casting of the blade. As a rule, rework of the cooling ribs is no longer necessary after the casting, in particular since an increased surface roughness produces better heat transfer, a factor which is usually desirable here.

The shroud cooling passage runs in the shroud element expediently essentially parallel to an inner surface of the shroud element and expediently extends over the entire shroud element. The shroud element is subdivided into a pressure-side region, a central region and a suction-side region.

The shroud cooling passage extends at least partly over the pressure-side region of the shroud element and likewise at least partly over the suction-side region of the shroud element. In this case, the flow-guiding element or elements is/are preferably arranged in the pressure-side region of the shroud cooling passage and/or in the suction-side region of the shroud cooling passage in such a way that the cooling-fluid flow produces greater cooling capacity in the pressure-side region of the shroud cooling passage than in the suction-side region of the shroud cooling passage during operation of the turbomachine blade. The pressure-side region of a shroud element is normally subjected to higher aerodynamic and thermal loading. Due to a greater cooling capacity of the cooling-fluid flow of the shroud cooling passage in the pressure-side region of the shroud element, the pressure-side region of the shroud element can be thermally relieved, so that the shroud element experiences largely homogeneous thermal loading overall.

According to a further advantageous development of the invention, an inflow of the cooling fluid to the shroud cooling passage is effected in a first region of the shroud element and an outflow from the shroud cooling passage is effected in a second region of the shroud element, the first region being arranged upstream of the second region with regard to a main flow of the turbomachine blade. The flow-guiding elements arranged in the pressure-side region of the shroud cooling passage then expediently run essentially parallel to the direction of the main flow, and the flow-guiding elements arranged in the suction-side region of the shroud cooling passage run essentially transversely to the direction of the main flow. This leads to the cooling-fluid flow forming increasingly in the pressure-side region of the shroud cooling passage. At the same time, an increased heat transfer coefficient compared with the suction-side region of the shroud cooling passage is thus also obtained here on account of the higher flow velocities of the cooling fluid in the pressure-side region of the shroud cooling passage.

The expression "essentially parallel to the direction of the main flow" comprises deviations from the direction of the main flow of 0° to plus/minus 45°. The expression "essentially transversely to the direction of the main flow" comprises deviations from the direction running transversely to the direction of the main flow of 0° to plus/minus 45°.

According to a further expedient configuration of the invention, the flow-guiding element is designed as a flow baffle plate. A flow baffle plate fulfills essentially only the function of the flow guidance. Heat conduction only takes place to a minor extent on account of the relatively small thickness of the flow baffle plate of only a few millimeters. A flow baffle plate may, but need not always, extend over the entire clearance height of the shroud cooling passage.

A first throughflow passage and a second throughflow passage which extend in each case in the blade longitudinal direction are expediently arranged inside the airfoil. The first throughflow passage is preferably connected at its blade-root-side end to the cooling-fluid feed and at its blade-tip-side end to the blade-tip-side end of the second throughflow passage. The second throughflow passage is connected at its blade-root-side end to at least one cooling-fluid discharge. The shroud cooling passage has at least one inlet opening and at least one outlet opening, the inlet opening of the shroud cooling passage opening into the first throughflow passage and the outlet opening of the shroud cooling passage opening into the second throughflow passage. The cooling-fluid mass flow is fed via the first throughflow passage to the shroud cooling passage, flows through the shroud cooling passage and is at least mostly discharged again via the second throughflow passage.

The first throughflow passage and the second throughflow passage are expediently connected to one another via a further, direct connection. This direct connection serves to allow some of the total cooling-fluid mass flow to pass directly from the first throughflow passage into the second throughflow passage without first having to flow through the shroud cooling passage. The total cooling-fluid mass flow may therefore be greater than the cooling-fluid mass flow which is used for cooling the shroud cooling passage. The total cooling-fluid mass flow fed via the first throughflow passage is therefore divided, on the one hand, into the cooling-fluid mass flow which is directed through the shroud cooling passage in order to cool the shroud element and, on the other hand, into a further cooling-fluid mass flow which passes via the further connection directly into the second throughflow passage.

The first throughflow passage is expediently arranged in the airfoil in such a way as to adjoin a leading edge of the airfoil, and the second throughflow passage is expediently arranged in the airfoil in such a way as to adjoin a trailing edge of the airfoil. The fresh cooling fluid consequently flows first along the airfoil leading edge, which is subjected to high thermal loading, then through the shroud cooling passage and finally along the airfoil trailing edge, which is subjected to low thermal loading. This leads to adapted cooling of the turbomachine blade and to high cooling effectiveness of the cooling fluid used.

Furthermore, at least one pair of further throughflow passages which in each case extend in the blade longitudinal direction are expediently arranged between the first throughflow passage and the second throughflow passage in the airfoil. The throughflow passages are connected to one another in such a way that a serpentine-like passage course is formed overall in the airfoil.

A flow baffle plate is preferably arranged only in the region of the outlet opening. Here, the flow baffle plate arranged in the region of the outlet opening ensures that the cooling fluid discharging from the shroud cooling passage flows uniformly into the second throughflow passage. If the second throughflow passage is connected to the first throughflow passage via a further, direct connection, the flow baffle plate is expediently arranged in such a way that the cooling fluid discharging from the shroud cooling passage is uniformly admixed with the cooling fluid flowing in via the direct connection.

According to a preferred embodiment of the invention, the cooling-fluid discharge comprises at least one outflow opening which is arranged in the region of the airfoil trailing edge. For the cooling-fluid discharge, it will usually be expedient for a multiplicity of outflow openings to be arranged in the region of the airfoil trailing edge in a uniformly distributed manner over the airfoil length. The cooling fluid consumed therefore flows via the at least one outflow opening or via the multiplicity of outflow openings into the main flow. In this case, due to a configuration of the outflow openings which is known to the person skilled in the art, the outflow is advantageously effected in such a way that the outflowing cooling fluid forms a cooling film over the airfoil trailing edge downstream of the outflow openings. As a result, the airfoil trailing edge is cooled especially effectively on the one hand. On the other hand, the mixing losses produced by the admixing of the cooling fluid with the main flow can thus be minimized.

According to an expedient development of the invention, at least one opening which communicates with the blade surroundings is arranged in at least one corner region of the shroud cooling passage, via which opening cooling fluid flows from the shroud cooling passage into the blade surroundings during operation of the turbomachine blade. Due to the arrangement of the at least one opening in the corner region of the shroud cooling passage, at least some of the cooling fluid located in the corner region is discharged through the opening into the surroundings. The constant outflow of cooling fluid through the at least one opening prevents a wake zone from forming in the corner region. A wake zone is often the cause of a local formation of hot spots.

According to an expedient use of the invention, the turbomachine blade is developed as a turbine blade of a gas turbine or a gas turboset, in particular as a stator part of a turbine.

In particular, considerable advantages with regard to the service life of the blades are obtained if all the blades of an inlet guide wheel of a turbine are designed in the manner according to the invention. The functioning of the gas turbine can then also be changed to the effect that a higher inlet temperature overall can be adjusted in the turbine, or the temperature profile over the blade height can be made more uniform. A temperature profile of the turbine inlet flow which drops in each case in the direction of the boundary walls is often necessary nowadays in order to avoid overheating of the boundary walls.

However, the turbomachine blade designed according to the invention may also be used in principle in a rotor of a gas turbine or a gas turboset.

BRIEF DESCRIPTION OF THE DRAWINGS

The invention is explained in more detail below with reference to an exemplary embodiment illustrated in the drawings, in which.

Only the elements and the components essential for the understanding of the invention are shown in the Figures.

DETAILED DESCRIPTION OF AN EXEMPLARY EMBODIMENT

The exemplary embodiment shown is to be understood purely instructively and is intended to serve for the better understanding but not as a restriction of the subject matter of the invention.

Figure 1:
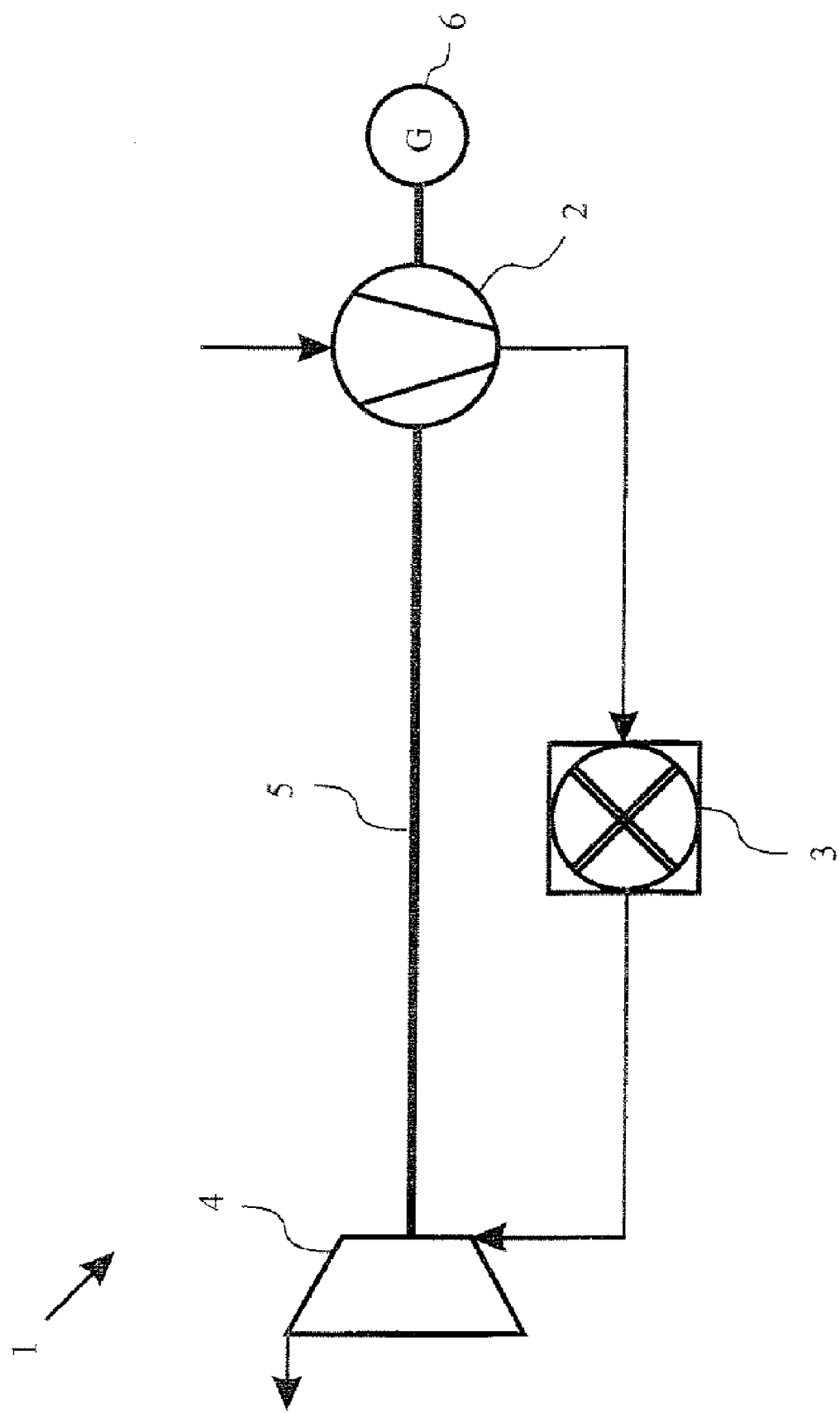
FIG. 1 shows a greatly simplified illustration of a gas turboset.

Shown in FIG. 1 is a highly schematic illustration of a gas turobset as is familiar to the person skilled in the art and as is frequently used for the generation of electricity or for stationary and mobile drives, such as aircraft drives for example. The gas turboset shown by way of example comprises as essential subassemblies a compressor 2, a combustion chamber 3 and a turbine 4. Incoming ambient air is compressed in the compressor 2 and fed to the combustion chamber 3. In the combustion chamber 3, fuel is admixed with the compressed air and the mixture is burned. By means of the turbine 4, the hot gas produced in the combustion chamber 3 is expanded to perform work. In the stationary turbine plant shown in FIG. 1, the turbine 4 is connected via a shaft 5 to both the compressor 2 and a further power consumer 6, for example a generator serving to generate electricity, and drives the latter via the shaft 5. It is of course also possible for the gas turboset to be of multi-shaft construction, having a plurality of turbines and combustion chambers arranged in between, having a plurality of compressors and coolers arranged in between, and the like. These embodiments are familiar to the person skilled in the art and merely put the invention into an application-relevant context, for which reason they are not described in more detail at this point.

Figure 2:
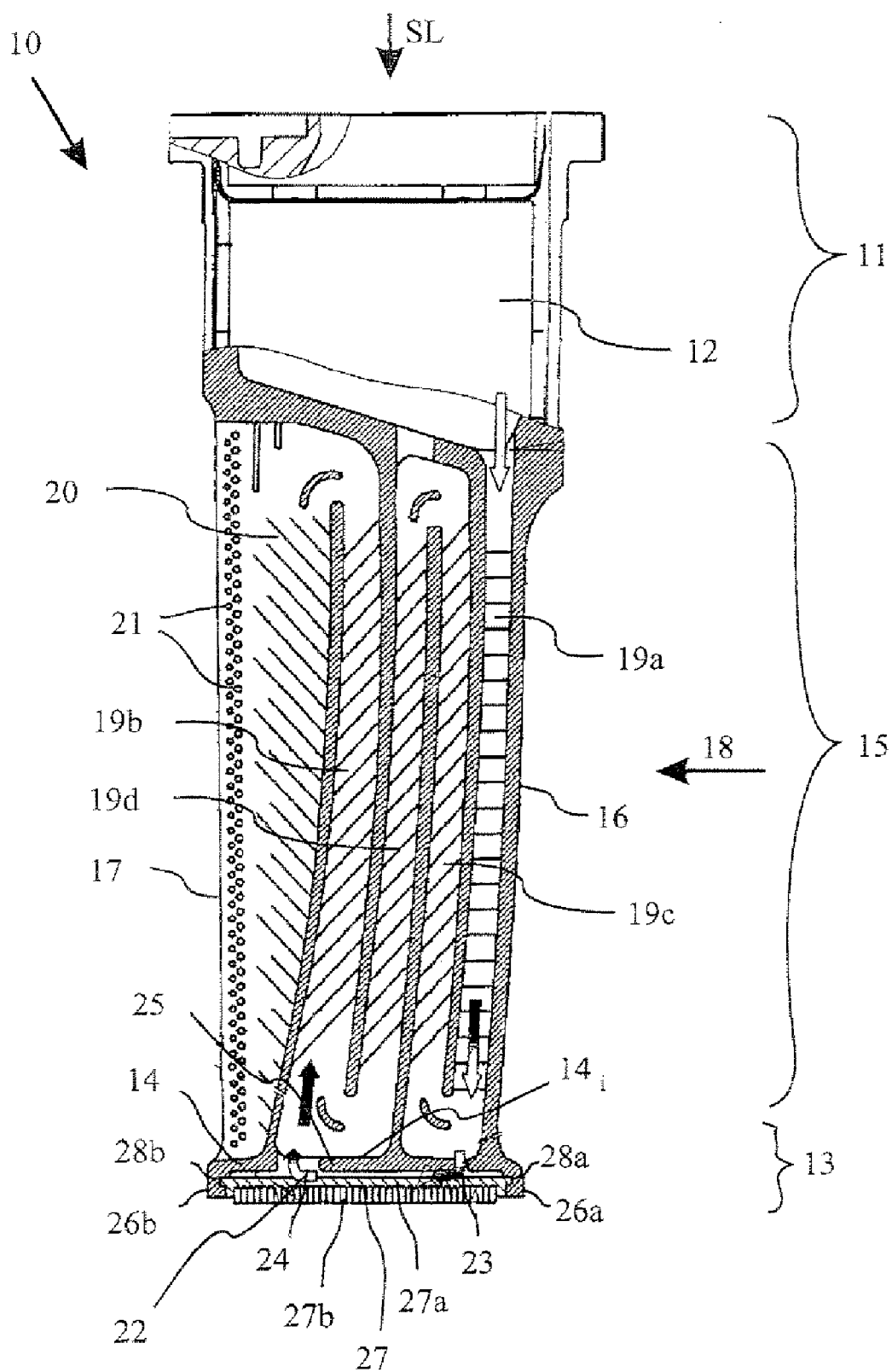
FIG. 2 shows a longitudinal section through a turbomachine blade designed according to the invention.
Figure 3:
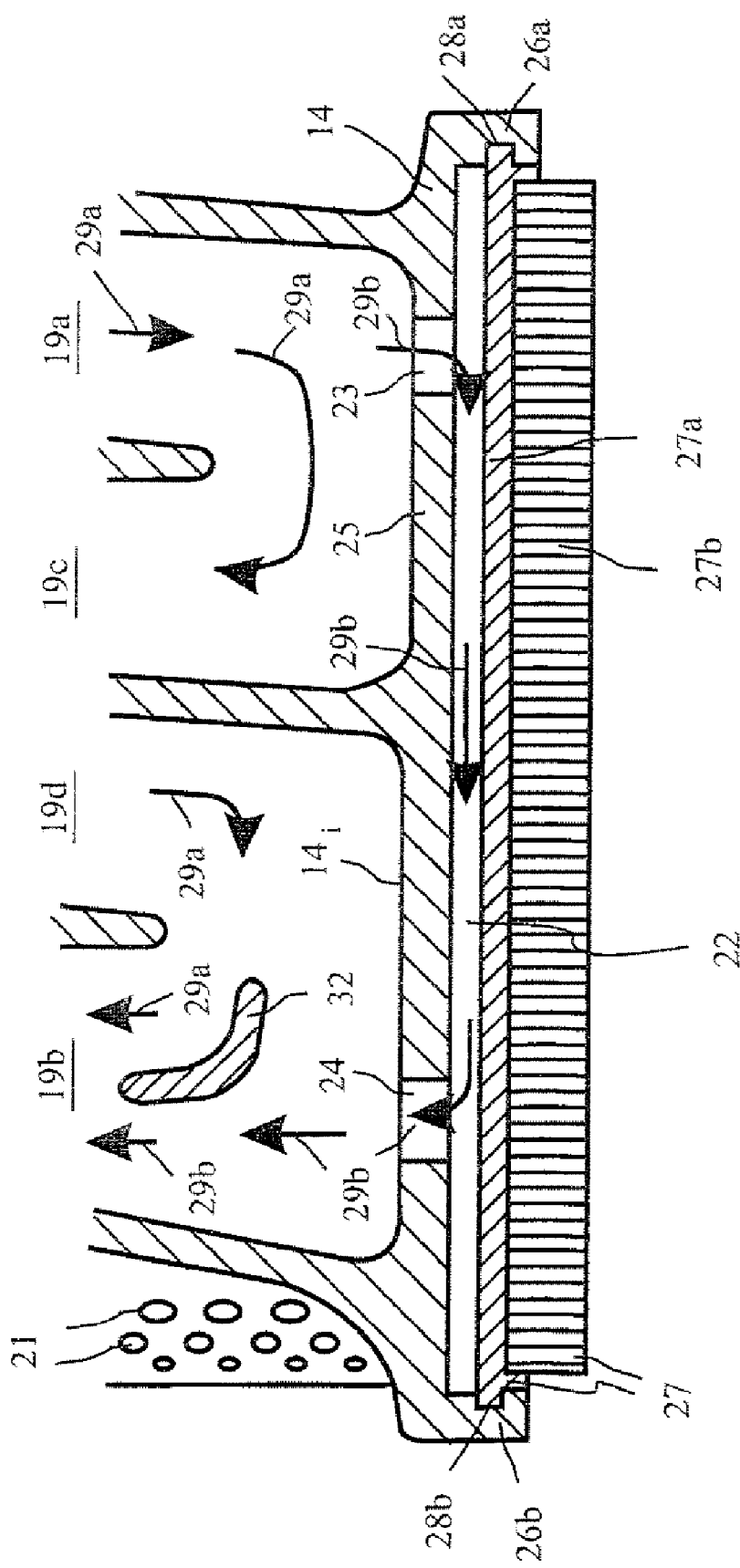
FIG. 3 shows a detailed view of the turbomachine blade from FIG. 2.
Figure 4:
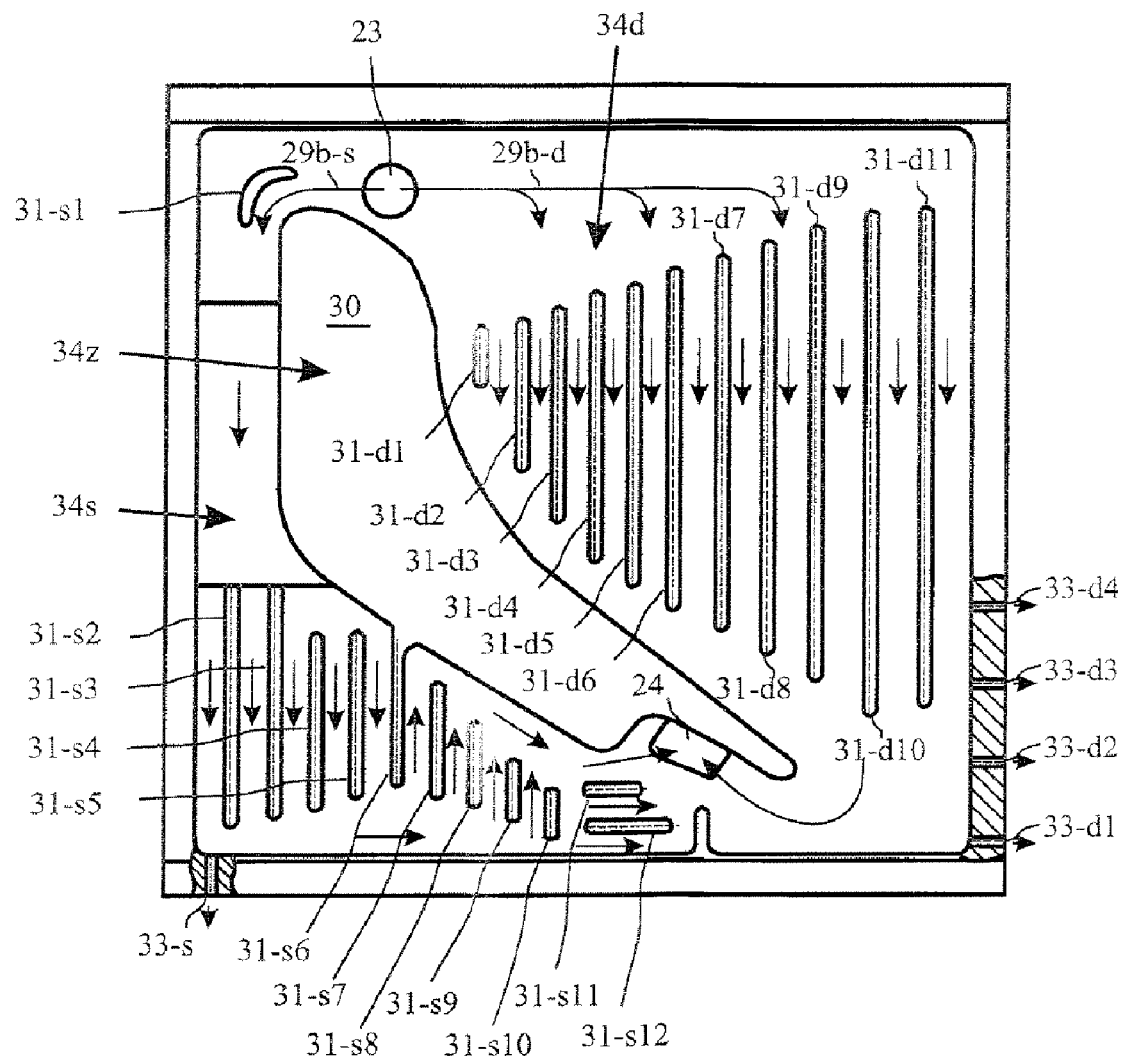
FIG. 4 shows the shroud segment of FIG. 2 in a bottom view.

A turbomachine blade 10 (in brief: blade) designed according to the invention is shown in FIGS. 2 to 4. FIG. 2 shows a longitudinal section through the fluidically internally cooled blade 10 designed according to the invention, whereas FIG. 3 reproduces the blade tip 13 of the blade 10 in a detailed view. FIG. 4 shows a bottom view of the shroud element 14 of the blade 10.

Here, the blade 10 is designed as the blade of a stator of a turbine, specifically as a blade of an inlet guide wheel of a turbine, and may be used, for example, in the turbine 4 of the gas turboset 1. However, the invention may also be applied to a rotor blade of a turbine or to blades used in another way.

As shown in FIG. 2, the blade 10 comprises a blade root 11 with a cooling-fluid feed 12, a blade tip 13 which is formed with a shroud element 14, and an airfoil 15. The airfoil 15 extends in the blade longitudinal direction SL between the blade root 11 and the blade tip 13 and has an airfoil leading edge 16 and an airfoil trailing edge 17.

The main flow of the turbine flows through the blade in FIG. 2 from right to left according to arrow 18, the flow duct being defined on the casing side by the blade root 11 and on the hub side by the shroud element 14.

As can be seen from the longitudinal section according to FIG. 2, a total of four throughflow passages 19a-19d are arranged inside the airfoil, these throughflow passages 19a-19d each extending essentially in the blade longitudinal direction SL. At their ends, the throughflow passages 19a-19d are connected to one another in such a way that a serpentine-like cooling-passage course in the airfoil 15 is formed overall. Here, the throughflow passage adjoining the airfoil leading edge 16 is designated as first throughflow passage 19a, and the throughflow passage adjoining the airfoil trailing edge 17 is designated as second throughflow passage 19b. The throughflow passages arranged between the first and the second throughflow passage are designated in the direction of the main flow as third throughflow passage 19c and as fourth throughflow passage 19d.

The first throughflow passage 19a is connected at its blade-root-side end to the cooling-fluid feed 12 and at its blade-tip-side end, via the third and the fourth throughflow passage 19c and 19d, to the blade-tip-side end of the second throughflow passage. The second throughflow passage is in turn connected at the blade-root side to a cooling-fluid discharge passage 20 which extends along the airfoil trailing edge 17. Furthermore, a multiplicity of outflow openings 21 are arranged at the airfoil trailing edge 17, via which outflow openings 21 the cooling fluid flows off from the cooling-fluid discharge passage 20 into the surroundings of the blade. The outflow openings 21 are arranged in an approximately uniformly distributed manner over the airfoil length.

Here, as cooling fluid, air is branched off from the compressor region and fed via the cooling-fluid feed 12 to the first throughflow passage 19a. From here, the air 29a, following the serpentine-like cooling passage course, flows through the airfoil 15. Due to the low temperature of the cooling fluid compared with the hot turbine main flow, convective heat transfer occurs along the walls of the throughflow passages and thus cooling of the airfoil 15 occurs. At the end of the second throughflow passage 19b, the cooling fluid heated up to then and thus largely consumed passes into the cooling-fluid discharge passage 20 and is distributed from here approximately uniformly to the outflow openings 21. The cooling fluid ultimately passes via the outflow openings 21 to the outside of the airfoil and thus into the turbine main flow. Here, when flowing out of the outflow openings 21, the cooling fluid additionally forms a cooling film at the trailing edge, this cooling film protecting the thin trailing edge from the hot main flow.

In order to cool the shroud element 14 in addition to the airfoil 15, a shroud cooling passage 22 is arranged in the shroud element 14. The shroud cooling passage 22, which is of slot-shaped design here, is connected via an inlet opening 23 to the first throughflow passage 19a and via an outlet opening 24 to the second throughflow passage 19b.

According to the flow guidance shown in FIG. 2, the cooling fluid serving to cool the shroud element 14 is extracted from the total mass flow of cooling fluid fed through the first throughflow passage 19a and is fed to the shroud cooling passage 22 via the inlet opening 23. After flowing through the shroud cooling passage 22, most of the cooling fluid is discharged via the outlet opening 24 into the second throughflow passage 19b, where the cooling fluid 29b used for cooling the shroud element 14 is brought together again with that cooling fluid 29a which has been directed through the third and fourth throughflow passages 19c and 19d. From there, the cooling fluid passes jointly into the cooling-fluid discharge passage 20 and via the outflow openings 21 into the turbine main flow.

The shroud cooling passage 22 shown in FIG. 2 is formed in the shroud element 14 so as to extend over the entire shroud element essentially parallel to the inner surface 14i of the latter.

To this end, the blade tip 13 shown in FIG. 2 comprises a first facing 25 which covers the airfoil 15. Furthermore, a respective closure web 26a and 26b is arranged in the region of the airfoil leading edge 16 and in the region of the airfoil trailing edge 17 and in each case extends from the first facing 25 perpendicularly to the latter. Between the closure webs 26a and 26b, a further facing 27 is arranged at a distance from the first facing 25 in such a way that the intermediate space between the first facing 25 and the further facing 27 results in the shroud cooling passage 22. The inlet opening 23 and the outlet opening 24 are formed in the first facing 25. Whereas the blade root 11, the airfoil 15, the first facing 25 and the closure webs 26a and 26b are produced as a one-piece casting, the further, second facing 27 is inserted between the closure webs only after completion of the casting and is fixed via a groove connection 28a and 28b. Here, the further, second facing 27 comprises two layers 27a and 27b.

As can readily be seen in particular from FIGS. 3 and 4, flow-guiding elements 30, 31-d1-31-d1, 31-s1-31-s12, 32 are additionally arranged in the shroud cooling passage 22 and in the region of the outflow from the shroud cooling passage 22. The flow-guiding elements 30, 31-d1-31-d11, 31-s1-31-s12, 32 serve to guide the cooling-fluid flow 29b flowing through the shroud cooling passage.

As shown in FIG. 4, cooling ribs 30, 31-d1-31-d11, 31-s1-31-s12 are arranged as flow-guiding elements inside the shroud cooling passage 22. Furthermore, a flow baffle plate 32 is arranged as flow-guiding element in the outflow region from the shroud cooling passage 22.

Here, both the cooling ribs 30, 31-d1-31-d11, 31-s1-31-s12 arranged in the shroud cooling passage 22 and the flow baffle plate 32 arranged in the outflow region are integrally cast.

The cooling ribs 30, 31-d1-31-d11, 31-s1-31-s12 provided in the shroud cooling passage 22 serve to guide the cooling-fluid flow 29b flowing through the shroud cooling passage 22. The cooling-fluid flow is guided by means of the cooling ribs 30, 31-d1-31-d11, 31-s1-31-s12 in a predetermined manner through the shroud cooling passage 22 in such a way that an optimum cooling effect of the shroud cooling passage 22 is achieved, in the course of which the cooling intensity produced in the individual regions of the shroud cooling passage 22 varies.

To this end, the shroud element 14 is subdivided into a pressure-side region 34d, a central region 34z and a suction-side region 34s. The shroud cooling passage 22 extends over all three regions of the shroud element 14.

Formed in the region of the airfoil 15 in the shroud cooling passage 22 is a central cooling rib 30 having a contour which is similar to the airfoil 15 but essentially only borders the region of the throughflow passages 19a-19d. By means of the central cooling rib 30 contoured in this way, the cooling fluid in the shroud cooling passage 22 is directed around the cavity region of the airfoil 15. The cavity region is approximately the region in which the throughflow passages 19a-19d are arranged and which is therefore subjected to only low thermal loading or is cooled anyway.

Furthermore, as shown in FIG. 4, the cooling ribs 31-d1-31-d11 arranged in the pressure-side region 34d of the shroud cooling passage 22 are oriented differently from the cooling ribs 31-s1-31-s12 arranged in the suction-side region 34s of the shroud cooling passage 22. Here, the cooling ribs 31-d1-31-d11 arranged in the pressure-side region 34d of the shroud cooling passage 22 run essentially parallel to the direction of the main flow of the blade, whereas the cooling ribs 31-s1-31-s12 arranged in the suction side region 34s of the shroud cooling passage 22 run essentially transversely to the direction of the main flow of the blade. It has been found that the cooling-fluid flow thereby produces a greater cooling capacity in the pressure-side region 34d of the shroud cooling passage 22 than in the suction-side region 34s of the shroud cooling passage 22 during operation of the turbomachine blade.

The cooling fluid flows via the inlet opening 23 arranged in the upstream region of the shroud element into the shroud cooling passage 22. Due to the centrally arranged cooling rib 30, which has a contour similar to the airfoil but essentially bordering only the region of the throughflow passages 19a-19d, the cooling fluid entering the shroud cooling passage 22 is distributed either to the pressure-side region 34d of the shroud cooling passage 22 or to the suction-side region 34s of the shroud cooling passage 22. The cooling fluid in both cases first of all flows through a respective inflow section in which no cooling ribs are arranged. The inflow sections free of cooling ribs serve to enable the cooling fluid to effectively spread out over the entire width of the shroud cooling passage 22. This is followed in each case by sections in which the cooling ribs 31-d1-31-d11 and 31-s1-31-s12, respectively, are arranged. In the pressure-side region 34d of the shroud cooling passage 22, the cooling ribs 31-d1-31-d11 run essentially parallel to the direction of the main flow of the blade. In this case, the expression "essentially parallel to the direction of the main flow" comprises deviations from the direction of the main flow of 0° to plus/minus 45°. In the suction-side region 34s of the shroud cooling passage 22, the cooling ribs 31-s1-31-s12 run essentially transversely to the direction of the main flow. In this case, the expression "essentially transversely to the direction of the main flow" comprises deviations from the direction running transversely to the direction of the main flow of 0° to plus/minus 45°.

At the discharge from the cooling ribs 31-d1-31-d11 arranged in the pressure-side region 34d, the cooling fluid flows again into a collecting section free of cooling ribs and must flow from there around the tip of the centrally arranged cooling rib 30 in order to finally reach the outlet opening 24 of the shroud cooling passage 22.

In the suction-side region 34s, the cooling fluid is first of all directed away from the centrally arranged cooling rib 30 in the direction of the corner region of the shroud cooling passage 22 by a first group 31-s1-31-s5 and is then fed back again in the direction of the centrally arranged cooling rib 30 via a second group of cooling ribs 31-s7-31-s10. A cooling rib 31-s6 connected to the centrally arranged cooling rib and arranged between the first and the second group prevents the cooling fluid from being able to flow directly along the centrally arranged cooling rib 30. Here, downstream of the second group of cooling ribs 31-s7-31-s10 and directly upstream of the outlet opening 24, two further cooling ribs 31-s11 and 31-s12 which run parallel to the direction of the main flow of the blade are arranged in the suction-side region 34s of the shroud cooling passage. These two further cooling ribs 31-s11 and 31-s12 prevent cooling fluid from flowing to the outlet opening 24 over the shortest path after discharge from the second group of cooling ribs 31-s7-31-s10, but rather cause flow to occur in the region directly around the outlet opening 24.

However, in addition to the guidance of the cooling-fluid flow through the shroud cooling passage, in each case the surface of the shroud cooling passage 22 is also enlarged locally by means of the cooling ribs 31-d1-31-d11 and 31-s1-31-s12. This leads to an increase in the heat transfer in the regions around the cooling ribs, so that, in this way, the cooling capacity in these regions is in each case increased locally.

On the whole, a distribution and orientation of the cooling ribs effected in this way results in the cooling fluid flowing through in such a way as to cover the surface of the regions 34d, 34s of the shroud cooling passage 22 which are to be cooled. In the process, the cooling fluid 29b flowing through the shroud cooling passage cools the pressure-side region 34d of the shroud cooling passage 22 more intensively than the suction-side region 34s of the shroud cooling passage 22. This is due to the fact that, when comparing the two regions, an increased amount of heat is introduced into the pressure-side region by the main flow, this also being especially desirable. The cooling efficiency of the cooling fluid used for the cooling is also increased as a result. Furthermore, the risk of hot spots forming in particular inside the shroud element is considerably reduced.

On the other hand, the flow baffle plate 32 arranged in the outflow region from the shroud cooling passage serves essentially only to guide the flow. The flow baffle plate 32 causes the cooling fluid 29b discharging from the shroud cooling passage 22 via the outlet opening 24 to be admixed uniformly, and with the lowest possible mixture losses, with the remaining cooling-medium flow 29a flowing through the throughflow passages 19a-19d. To this end, the flow baffle plate 32 is positioned approximately centrally in the transition region from the fourth throughflow passage 19d to the second throughflow passage 19b in such a way that, on the one hand, the cooling fluid 29a coming from the fourth throughflow passage 19d is guided essentially on the underside of the flow baffle plate 32 and is deflected in the direction of the second throughflow passage 19b and, on the other hand, the cooling fluid 29b coming from the shroud cooling passage 22 is guided essentially on the top side of the flow baffle plate 32. The cooling-air flows 29a and 29b until then acting in the same direction are then mixed downstream of the flow baffle plate 32. By the cooling-fluid flows 29a and 29b being mixed in this way, the formation of flow vortices is largely avoided, so that only very small aerodynamic mixing losses occur. This mixing virtually free of flow losses reacts in turn directly on the cooling-fluid flow 29b inside the shroud cooling passage 22. In particular, the directed mixing prevents the occurrence of a backpressure of the cooling-fluid flow 29b inside the shroud cooling passage 22.

Here, however, no flow baffle plate is arranged in the region of the inlet opening 23.

Furthermore, as shown in FIG. 4, an opening 33-s is arranged here in the suction-side corner region of the shroud cooling passage 22, via which opening 33-s the shroud cooling passage 22 communicates with the blade surroundings. During operation of the turbomachine blade, cooling fluid discharges from the shroud cooling passage 22 through this opening into the blade surroundings. In this case, the primary function of the opening 33-s, which is designed as a bore, is to draw off dust that has collected in the suction-side corner region.

Further openings 33-d1-33-d4 . . . which are designed as bores are located in the pressure-side boundary wall of the shroud cooling passage, the openings 33-d1-33-d4 . . . being arranged approximately equally over the boundary wall. In an arrangement of the blade in a turbine, a shroud element, of expediently identical construction, of an adjacent blade adjoins the pressure-side boundary wall. During operation of the turbomachine blade, cooling fluid flows from the shroud cooling passage into the gap between the shroud elements of the blades adjacent to one another and cools the walls defining the gap.

It has been found that reliable and efficient cooling of the shroud element 14 over the entire operating range of the turbine is ensured by the embodiment of the blade 10 according to the invention. Hot spots are therefore reliably avoided. This leads to an increased service life of the blades.

In addition to reliable and efficient cooling of the shroud element, adequate and efficient cooling of the entire blade is ensured by the arrangement of the throughflow passages 19a-19d of the blade shown in FIGS. 2 to 4 and of the resulting cooling-fluid flow through the airfoil. The flow guidance selected here for the cooling fluid leads to improved cooling effectiveness of the cooling fluid overall compared with conventional blades known from the prior art.

The turbomachine blade 10 shown in FIGS. 2 to 4 only represents an exemplary embodiment of the invention, it being possible for this embodiment to be readily modified in many different ways by the person skilled in the art. Thus, for example, the outflow openings at the blade trailing edge may be dispensed with, and the cooling-fluid discharge may be effected via a cooling-fluid discharge passage arranged in the blade.

What is claimed is:

1. A turbomachine blade, comprising:
   a blade root;
   a blade tip;
   an airfoil extending between the blade root and the blade tip in a blade longitudinal direction and having a suction side and a pressure side;
   a shroud element disposed on the blade tip;
   at least one throughflow passage disposed inside the airfoil and extending in the blade longitudinal direction;
   a shroud cooling passage disposed in the shroud element along a section of the shroud element, the shroud cooling passage being connected via an inflow opening and an outflow opening to the at least one throughflow passage, wherein a cooling fluid flows through the shroud cooling passage during operation of the turbomachine blade, from the inflow opening to the outflow opening;
   at least one flow-guiding element configured to guide at least some of the cooling fluid flowing through the shroud cooling passage, the at least one flow guiding element disposed in at least one of the shroud cooling passage, a region of the inflow opening, and a region of the outflow opening; and
   at least one opening communicating with a blade surroundings disposed in the shroud cooling passage, wherein the cooling fluid flows from the shroud cooling passage into the blade surroundings during operation of the turbomachine blade.

2. The turbomachine blade as recited in claim 1, wherein the turbomachine blade is a turbine blade of one of a gas turbine and a gas turboset.

3. The turbornachine blade as recited in claim 1, wherein the at least one flow-guiding element is a cooling rib.

4. The turbomachine blade as recited in claim 1, wherein the at least one flow-guiding element includes a plurality of cooling ribs disposed in the shroud cooling passage.

5. The turbomachine blade as recited in claim 1, wherein the at least one flow-guiding elementis integrally cast in the shroud cooling passage.

6. The turbomachine blade as recited in claim 1, wherein the shroud cooling passage is slot-shaped.

7. The turbomachine blade as recited in claim 1, wherein the shroud element includes a pressure-side region, a central region and a suction-side region, and the shroud cooling passage extends at least partly over the pressure-side region and at least partly over the suction-side region, and wherein a positionof a pressure-side regionof the at least one flow-guiding element in the shroud cooling passage is operatively connected to a greater cooling capacity provided in the shroud cooling passage.

8. The turbomachine blade as recited in claim 7, wherein an inflow of the cooling fluid to the shroud cooling passage is effected in a first region of the shroud element and an outflow from the shroud cooling passage is effected in a second region of the shroud element, the first region being arranged upstream of the second region with regard to a main flow of the turbomachine blade, and wherein the flow-guiding elements disposed in the pressure-side region of the shroud cooling passagerun essentially parallel to the direction of the main flow, and the flow-guiding elements disposed in the suction-side region of the shroud cooling passage run essentially transversely to the direction of the main flow.

9. The turbomachine blade as recited in claim 1, wherein the at least one flow-guiding element has a contour similar to the airfoil, borders essentially the region of the throughflow passage and is disposed in the shroud cooling passage.

10. The turbomachine blade as recited in claim 1, wherein the at least:one flow-guiding element is a flow baffle plate.

11. The turbomachine blade as recited in claim 1, further comprising a further throughflow passage disposed inside the airfoil and extending in the blade longitudinal direction, wherein the throughflow passage is connected at the blade-root-side end to a cooling-fluid feed and at the blade-tip-side end to the blade-tip-side end of the further throughflow passage, and the further throughflow passage is connected at. the blade-root-side end to a cooling-fluid discharge and the shroud cooling passage comprises an inlet opening that opens into the throughilow passage and an outlet opening that opens into the further throughflow passage.

12. The turbomachine blade as recited in claim 1, wherein the at least one opening communicating with a blade surroundings is disposed in at least one corner region of the shroud cooling passage.

13. The turbomachine blade as recited in claim 1, wherein the turbomachine blade is a blade of a stator of a turbine.

14. The turbomachine blade as recited in claim 11, wherein the throughflow passage is disposed in the airfoil so as to adjoin a leading edge of the airfoil, and the further throughflow passage is disposed in the airfoil so as to adjoin a trailing edge of the airfoil trailing.

15. The turbomachine blade as recited in claim 11, further comprising at least one pair of additional throughflow passages, each extending in the blade longitudinal direction and disposed between the throughflow passage and the further throughflow passage in the airfoil so that the throughflow passage, the further throughflow passage and the pair of additional throughflow passages form a serpentine-like passage course in the airfoil.

16. The turbomachine blade as recited in claim 11, wherein the cooling-fluid discharge includes at least one outflow opening disposed in the region of the airfoil trailing edge.

17. A turbine stator having a plurality of turbomachine blades disposed side by side at a periphery, at least one turbomachine blade being designed as recited in claim 1.

18. The turbine stator as recited in claim 17, wherein the turbine stator is an inlet guide wheel of a turbine.

19. A gas turboset having at least one turbomachine blade as recited in claim 1.

20. A turbomachine blade, comprising:
   a blade root;
   a blade tip;
   an airfoil extending between the blade root and the blade tip in a blade longitudinal direction and having a suction side and a pressure side;
   a shroud element disposed on the blade tip;
   a first throughflow passage and a second throughflow passage, each disposed inside the airfoil and extending in the blade longitudinal direction, and connected to one another to form a serpentine-like passage course in the airfoil;
   a shroud cooling passage disposed in the shroud element along a section of the shroud element, the shroud cooling passage being connected via an opening to the throughflow passage, wherein a cooling fluid flows through the shroud cooling passage during operation of the turbomachine blade;

at least one flow-guiding element configured to guide at least some of the cooling fluid flowing through the shroud cooling passage, the at least one flow guiding element disposed in at least one of the shroud cooling passage, a region of the inflow opening, and a region of the outflow opening; and at least one opening communicating with a blade surroundings disposed in the shroud cooling passage, wherein the cooling fluid flows from the shroud cooling passage into the blade surroundings during operation of the turbomachine blade.

* * * * *